(12) United States Patent
Newton et al.

(10) Patent No.: US 6,453,097 B1
(45) Date of Patent: Sep. 17, 2002

(54) MINICORD CABLE APPARATUS HAVING HIGH MODULUS BUFFERED OPTICAL FIBER AND METHOD FOR MAKING

(75) Inventors: Wayne McCall Newton, Lilburn, GA (US); Carla Green Wilson, Conyers, GA (US)

(73) Assignee: Fitel USA Corp., Norcross, GA (US)

( * ) Notice: Subject to any disclaimer, the term of this patent is extended or adjusted under 35 U.S.C. 154(b) by 0 days.

(21) Appl. No.: 09/425,107

(22) Filed: Oct. 18, 1999

(51) Int. Cl.$^7$ ................................................. G02B 6/44
(52) U.S. Cl. ...................... 385/102; 385/103; 385/106; 385/113
(58) Field of Search .................................. 385/102, 103, 385/106, 113

(56) References Cited

U.S. PATENT DOCUMENTS

| | | | | |
|---|---|---|---|---|
| 4,653,851 A | * | 3/1987 | Pedersen | 385/103 |
| 4,723,831 A | | 2/1988 | Johnson | 350/96.23 |
| 4,781,433 A | * | 11/1988 | Arroyo | 385/102 |
| 5,193,134 A | * | 3/1993 | Pizzorno | 385/105 |
| 5,615,293 A | * | 3/1997 | Sayegh | 385/102 |
| 5,627,932 A | | 5/1997 | Kiel et al. | |
| 5,630,003 A | | 5/1997 | Arroyo | 385/113 |
| 6,178,278 B1 | * | 1/2001 | Keller | 385/109 |

FOREIGN PATENT DOCUMENTS

| | | | |
|---|---|---|---|
| DE | 2628070 | | 8/1977 |
| EP | 0545622 | | 6/1993 |
| EP | 0545622 A1 | * | 6/1993 |
| JP | 60153013 | | 8/1985 |

* cited by examiner

Primary Examiner—Cassandra Spyrou
Assistant Examiner—Leo Boutsikaris
(74) Attorney, Agent, or Firm—John M. Harman

(57) ABSTRACT

Embodiments of the invention include an optical fiber minicord cable and a communication system employing the minicord cable. The optical fiber minicord cable includes a buffered optical fiber having a first strength layer formed around the buffered optical fiber, a first fire resistant jacket formed around the first strength layer, a second strength layer formed around the first fire resistant jacket, and a second fire resistant jacket formed around the second strength layer. The first and/or second fire resistant jackets are made of a fluoropolymer such as poly(vinylidene fluoride) (PVDF) or poly(vinyl chloride) (PVC), including PVDF Solef® 32008 and low smoke poly(vinyl chloride) (LSPVC) Apex® 910. The first and/or second strength layers are made of, e.g., polyaramid yarns such as Kevlar® and Nomex®. The buffered optical fibers typically have conventional structure, with the buffer region made of a suitable material such as nylon (e.g., Huls 1670 Nylon), polyolefin, poly(vinylidene fluoride) (PVDF), poly(vinyl chloride) (PVC), or polyester. The optical fiber minicord cable is a plenum-rated, high modulus apparatus that also provides sufficient optical transmission properties. Alternatively, embodiments of the invention include a method of making a plenum-rated, high modulus optical fiber minicord cable. The method includes the steps of providing a buffered optical fiber, forming a first strength layer around the buffered optical fiber, forming a first fire resistant jacket around the first strength layer, forming a second strength layer around the first fire resistant jacket, and forming a second fire resistant jacket around the second strength layer.

23 Claims, 3 Drawing Sheets

MINICORD CABLE APPARATUS HAVING HIGH MODULUS BUFFERED OPTICAL FIBER AND METHOD FOR MAKING

BACKGROUND OF THE INVENTION

1. Field of the Invention

The invention relates to optical fiber cables. More particularly, the invention relates to plenum-rated optical fiber cables having high modulus buffered optical fibers.

2. Description of the Related Art

Optical energy transmission media such as optical fibers increasingly are being used not only for long haul transmission applications between communications networks but also for local area distribution within individual networks. Accordingly, more and more optical fiber cables are distributed throughout buildings. For example, optical fibers including buffered optical fibers are used in riser cables, which are used to interconnect cables entering building equipment rooms to wiring closets on upper floors. Also, buffered optical fibers are used in plenum space that extends from the riser closets on the floor to satellite closets.

In commercial buildings, the space between a finished (or drop) ceiling and the structure from which it is suspended often is used as a return-air plenum for the building heating and cooling systems. Also, the space conveniently is used for housing communication cables distributed throughout the building. However, because of fire hazards, such cables typically must satisfy various safety requirements to reduce the possibility of fire spreading through the plenum along the cables. Typically, the cables must be tested and approved by an authority such as the Underwriters' Laboratories. For example, the cables must pass the fire test known as UL910 (also known as the Steiner Tunnel test). Cables meeting such approval are said to be plenum rated.

Although many conventional optical fiber cables are plenum-rated, most of them exhibit shortcomings in other areas. For example, many conventional plenum-rated buffered optical fibers and optical fiber cables have poor optical or mechanical properties. For example, many conventional plenum-rated optical fibers do not have suitable mechanical strength to prevent unacceptable levels of microbending loss in during optical transmission. The mechanical strength of an optical fiber or optical fiber cable is characterized in terms of its modulus or modulus of elasticity, which refers to the relative stiffness or softness of a material. Besides unsatisfactory mechanical properties, many conventional plenum-rated optical fibers are difficult to strip away a portion thereof and thus are ill suited for terminating to various standardized connectors, such as the LC® connector or the ST® connector.

Accordingly, it is desirable to have available a high modulus buffered optical fiber or optical fiber cable apparatus that is plenum-rated.

SUMMARY OF THE INVENTION

The invention is embodied in an optical fiber minicord cable apparatus and a communication system employing the minicord cable apparatus. The system includes a source of optical energy, an optical fiber minicord cable coupled to the source for transmitting optical energy from the source, and an optical receiver or detector coupled to the minicord cable for receiving optical energy from the source. The optical fiber minicord cable includes a buffered optical fiber having a first strength layer formed around the buffered optical fiber, a first fire resistant jacket formed around the first strength layer, a second strength layer formed around the first fire resistant jacket, and a second fire resistant jacket formed around the second strength layer. The first and/or second fire resistant jackets are made of a fluoropolymer such as poly (vinylidene fluoride) (PVDF) or poly(vinyl chloride) (PVC). For example, fluoropolymers such as PVDF Solef® 32008 and low smoke poly(vinyl chloride) (LSPVC) Apex® 910 are useful materials for the fire resistant jackets. The first and/or second strength layers are made of, e.g., polyaramid yarns such as Kevlar® and Nomex®. The buffered optical fibers, which have a conventional or other suitable structure, comprise a core region, a cladding region formed around the core region, a coating region formed on the cladding region and a buffer region formed on the coating region. The buffer region is made of a material such as nylon (e.g., Huls 1670 Nylon), polyolefin, poly(vinylidene fluoride) (PVDF), poly (vinyl chloride) (PVC), or polyester.

Alternatively, embodiments of the invention include a method of making a high modulus, plenum-rated buffered optical fiber minicord cable. The method includes the steps of providing a buffered optical fiber, forming a first strength layer around the buffered optical fiber, forming a first fire resistant jacket around the first strength layer, forming a second strength layer around the first fire resistant jacket, and forming a second fire resistant jacket around the second strength layer. The buffered optical fiber typically has a conventional arrangement comprising a core region, a cladding region, a coating region and a buffer region. The buffer region is made of a suitable material such as nylon (e.g., Huls 1670 Nylon), polyolefin, poly(vinylidene fluoride) (PVDF), poly(vinyl chloride) (PVC), or polyester. The strength layers are made of, e.g., polyaramid yarns such as Kevlar and Nomex. The first and second fire resistant jackets are made of a fluoropolymer such as poly(vinylidene fluoride) (PVDF) or poly(vinyl chloride) (PVC), including, e.g., PVDF Solef® 32008 and low smoke poly(vinyl chloride) (LSPVC) Apex® 910.

DETAILED DESCRIPTION

Figure 1:
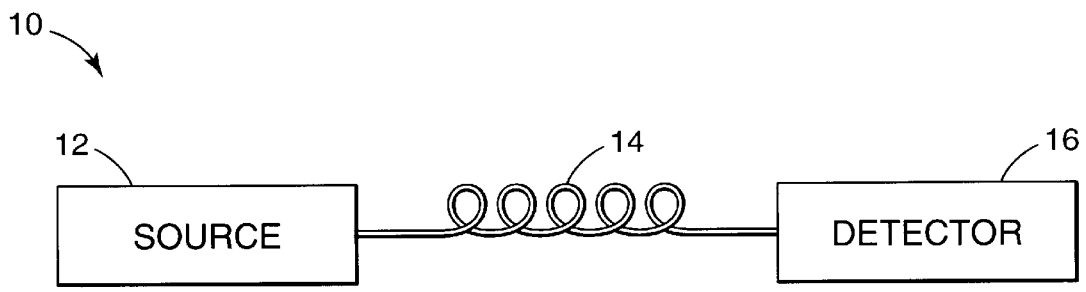
FIG. 1 is a simplified block diagram of an optical communications system according to embodiments of the invention.

In the following description like components are referred to by like reference numerals to enhance the understanding of the invention through the description of the drawings.

Although specific features, configurations and arrangements are discussed hereinbelow, it should be understood that such is done for illustrative purposes only. A person skilled in the relevant art will recognize that other steps, configurations and arrangements are useful without departing from the spirit and scope of the invention.

Referring now to FIG. 1, a simplified block diagram 10 of an optical communications system according to embodiments of the invention is shown. The optical communications system 10 includes one or more optical sources 12 coupled, e.g., in a conventional manner, to one or more plenum-rated, high modulus optical fiber minicord cables 14 having one or more buffered optical fibers. For purposes of discussion herein, modulus refers to modulus of elasticity or elastic modulus, and thus is concerned with the relative stiffness or softness of the optical fiber minicord cable 14. The optical fiber minicord cables 14 are configured in accordance with embodiments of the invention, e.g., as will be discussed hereinbelow. That is, the buffered optical fibers within the minicord cables 14 are plenum-rated and have a sufficiently high modulus for adequate mechanical strength. The optical fiber cables 14 are coupled to one or more optical detectors or receivers 16, e.g., in a conventional manner.

Conventionally, an optical energy transmission medium such as an optical fiber within an optical fiber cable includes a glass core region surrounded by a glass cladding region having an index of refraction lower than that of the core region, and one or more protective coating layers. Although the diameter of the core region may vary (approximately 5–10 microns for single mode, and approximately 50–62.5 microns for multimode), the total diameter of the cladding region surrounding the core region typically is approximately 125 microns ($\mu$m). The optical fiber cladding region typically is covered, for protection and strength, with one or more coating region layers, resulting in a total outer diameter of approximately 250 $\mu$m to 1000 $\mu$m.

The optical fiber typically is formed from a glass preform containing a core rod inside of a cladding rod. The preform generally is suspended vertically and moved into a furnace at a controlled rate. The preform rod softens in the furnace and optical fiber is drawn from the molten end of the preform rod by a capstan located at the base of a draw tower. One or more coating layers, which typically are made of thermoplastics or liquid applied curable plastic resins, are applied to the fiber immediately after the optical fiber is drawn and prior to contact between the fiber and any other surface. The coating layers are cured into a protective coating region, e.g., by exposure to ultraviolet (UV) radiation.

Buffered optical fibers include a buffer region formed around the coating layers. The buffer region includes one or more layers of thermoplastic material such as nylon (e.g., nylon 12 or Huls 1670 nylon), polyolefin, poly(vinylidene fluoride) (PVDF) or other fluoropolymer, poly(vinyl chloride) (PVC), or polyester. The buffer region includes, e.g., a single layer or, alternatively, an inner buffer layer formed around the outer coating of the optical fiber and an outer buffer layer formed around the inner buffer layer. Typically, an extruder extrudes the one or more buffer region layers around the coated optical fiber. The inner buffer layer often has a lower modulus than the outer buffer layer to promote the ability to strip all or a portion of the buffer region from the coated optical fiber, e.g., to connect the end of the optical fiber to a connector such as an LC® or ST® connector.

Figure 2:
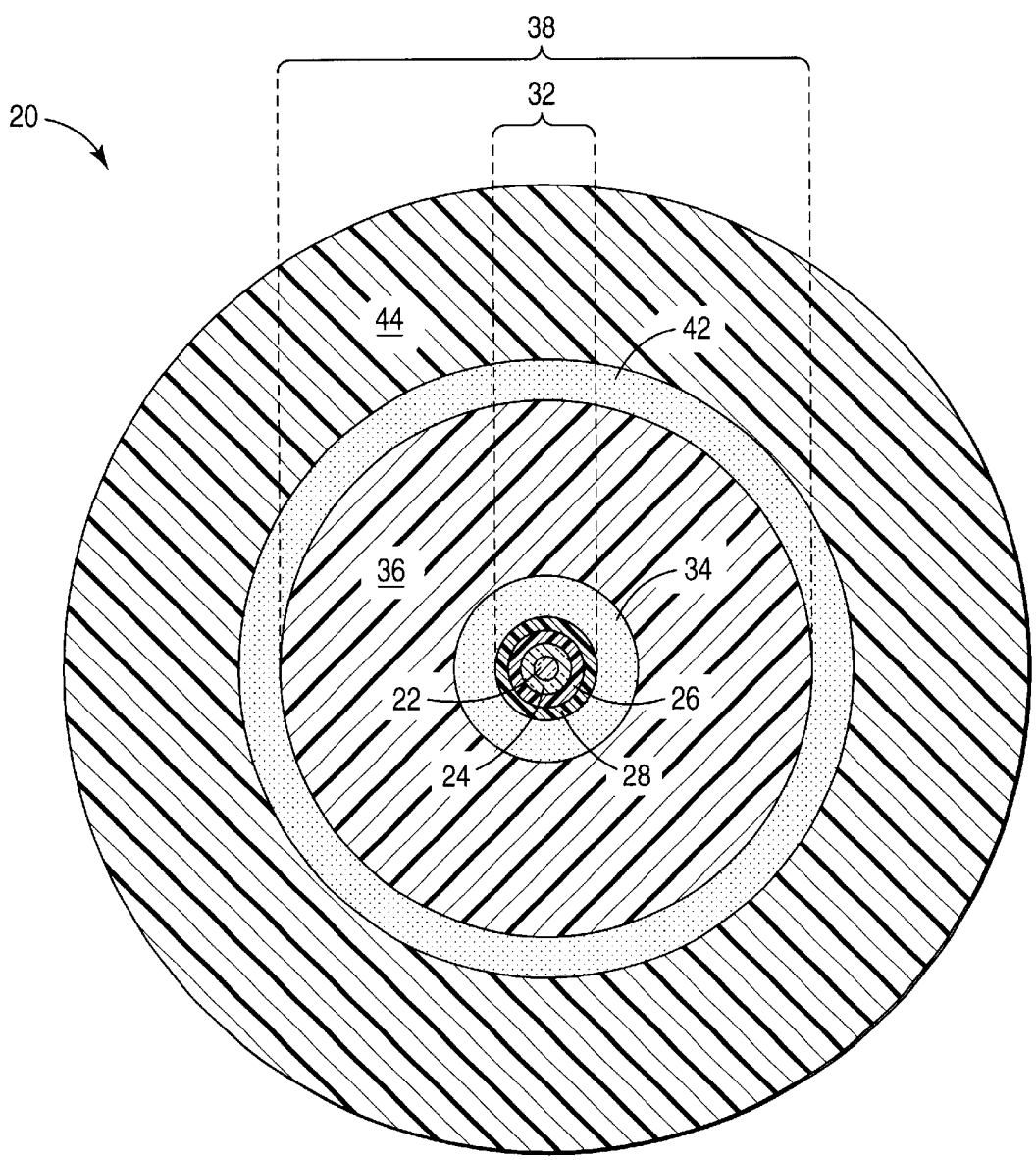
FIG. 2 is a cross-sectional view of a plenum-rated, high modulus buffered optical fiber according to an embodiment of the invention.

Referring now to FIG. 2, shown is a plenum-rated, high modulus minicord cable 20 according to embodiments of the invention. Although the minicord cable 20 is shown having only one buffered optical fiber (shown generally as 32) therein, other embodiments (including the embodiment shown in FIG. 3 and discussed hereinbelow) include arrangements wherein a plurality of buffered optical fibers are maintained therein.

In conventional arrangements, the buffered optical fiber 32 comprises a core region 22, a cladding region 24, a coating region 26 and a buffer region 28. Buffer regions made of, e.g., nylon 12 (i.e., Huls 1670) often provide adequate mechanical strength and are suitable for terminating connectors thereto. However, because such buffer regions offer poor fire resistance, optical fibers having such buffer region often fail standard fire tests (e.g., UL910). Conventional arrangements using other buffer region materials such as PVDF offer improved fire resistance but demonstrate unsatisfactory mechanical strength and optical signal transmission properties.

Because of these shortcomings, conventional arrangements evolved into minicord arrangements. Minicord arrangements typically comprise a conventional buffered optical fiber (e.g., buffered optical fiber 32) having a strength layer 34 formed around the buffer region 28 and a protective jacket or layer 36 formed around the strength layer 34. A conventional minicord arrangement of this kind is denoted in the figure generally by the reference character 38.

Typically, a minicord 38 has an outer diameter within the range from approximately 1.52 millimeters (mm) to approximately 1.68 mm. Many conventional minicord designs provide a single fiber cable having an outer diameter of, e.g., approximately 1.60 mm. Such a minicord cable meets a number of specifications, including several listed in, e.g., Bellcore publication GR-409.

The strength layer 34 is made of, e.g., polyaramid yarns such as Kevlar® and Nomex®. The protective jacket layer 36 is made of a fluoropolymer such as poly(vinylidene fluoride) (PVDF) or poly(vinyl chloride) (PVC). However, despite the additional strength layer and the protective fire resistant layer, many conventional minicord arrangements with sufficient mechanical strength still fail to provide fire resistance sufficient to pass plenum rating fire tests. Similarly, many plenum-rated conventional minicord arrangements fail to have sufficient mechanical strength.

According to embodiments of the invention, conventional minicord arrangements 38 are configured with an additional strength layer 42 and an additional protective jacket 44. The additional or second strength layer 42 is formed around the first protective jacket 36 and the additional or second protective jacket 44 is formed around the second strength layer 42. In this manner, optical fibers and/or optical fiber cables having the inventive arrangement provide sufficient fire resistance to pass standard fire tests and thus are plenum rated. Also, the inventive fibers provide sufficient mechanical strength due to the plurality of high modulus strength layers while also maintaining satisfactory transmission properties.

More specifically, optical fibers according to embodiments of the invention have a second strength layer 42 formed around the first protective jacket 36 and a second protective jacket formed around the second strength layer 42. The second strength layer 42 or region is made of, e.g., polyaramid yarns such as Kevlar and Nomex, or other suitable high modulus materials and is in the form of a yarn or yarn layer. The second strength layer 42 has a thickness typically within the range from approximately 0.10 mm to approximately 0.25 mm.

The second protective jacket 44 is made of, e.g., a fluoropolymer such as poly(vinylidene fluoride) (PVDF) or poly(vinyl chloride) (PVC). Exemplary fluoropolymers include, e.g., PVDF Solef® 32008 and low smoke poly (vinyl chloride) (LSPVC) Apex® 910. The second protective jacket 44 has a thickness typically within the range from approximately 0.43 mm to approximately 0.68 mm.

According to an embodiment of the invention, the buffered optical fiber 32 having a Huls 1670 Nylon buffer region 28 has formed therearound a first strength layer 34 made of polyaramid yarn, a first jacket layer 36 made of Apex 910, a second strength layer 42 made of polyaramid yarn, and a second jacket layer 44 made of Solef 32008. Alternatively, both the first jacket 36 and the second jacket 44 are made of Solef 32008.

Figure 3:
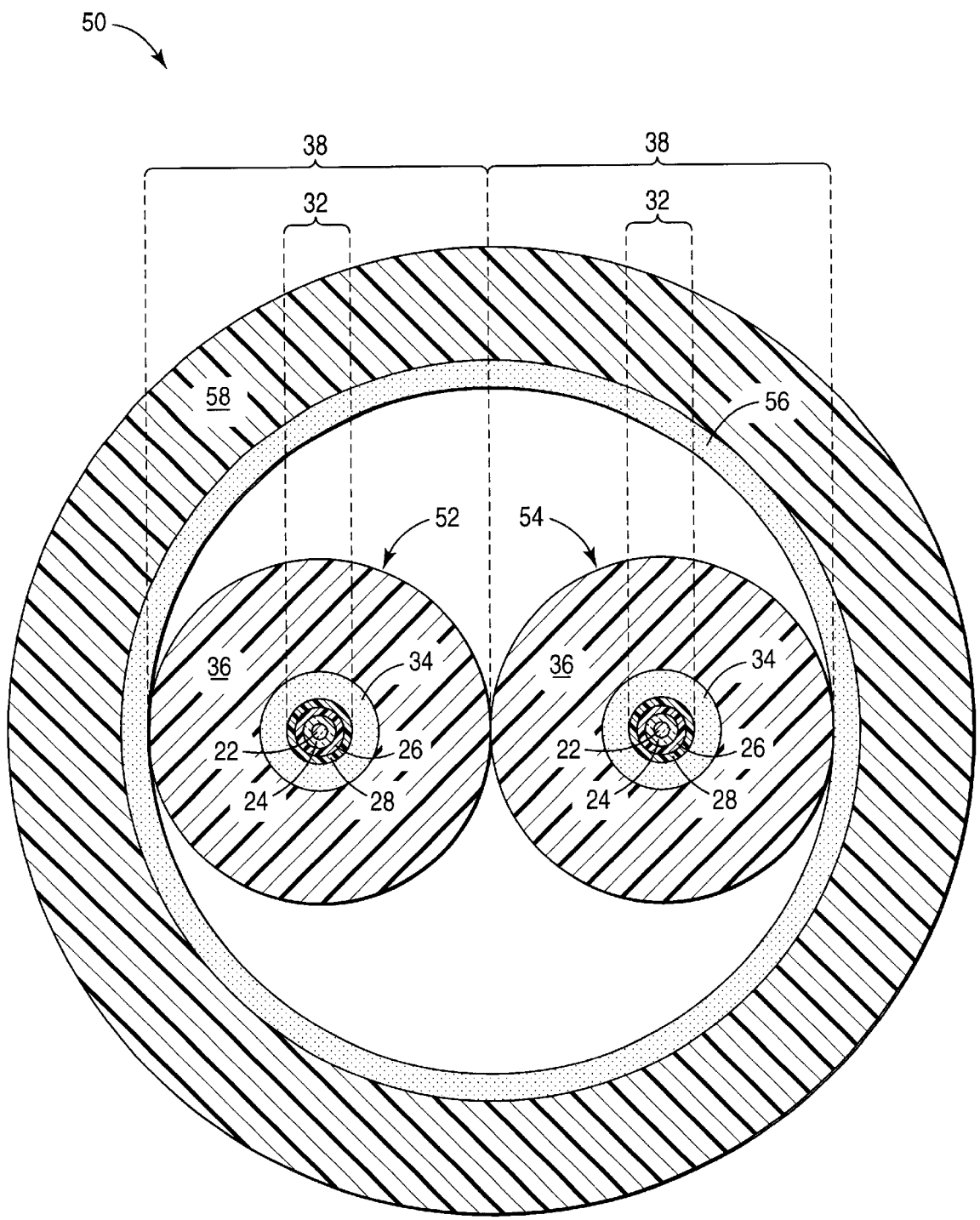
FIG. 3 is a cross-sectional view of a plenum-rated, high modulus buffered optical fiber according to another embodiment of the invention.

FIG. 3 is a cross-sectional view of a plenum-rated optical fiber minicord cable 50 having a pair of high modulus buffered optical fiber minicords 52, 54 therein. The minicords 52, 54 are similar in general structure to the minicord 38 in FIG. 2. However, unlike the minicord in FIG. 2, which has its own second strength region 42 and jacket 44, embodiments of the invention shown in FIG. 3 have a second strength region 56 formed around both minicords 52, 54 and a second jacket 58 formed around the second strength region 56.

Although not shown, alternative embodiments of the invention include a minicord cable apparatus having more than two high modulus buffered optical fibers therein.

EXAMPLE 1

The following example is for illustration purposes only and is not meant to be a limitation of embodiments of the invention. In this example, the UL910 fire test was performed on two minicord cables configured according to embodiments of the invention. The first minicord cable (CR01888) included a buffer region made of nylon, a first jacket made of Apex 910 and a second jacket (thickness of 0.022 inch) made of Solef 32008. The second minicord cable (CR01889) included a buffer region made of nylon, a first jacket made of Solef 32008 and a second jacket (thickness of 0.022 inch) made of Solef 32008.

TABLE 1

| | | UL 910 Results | | |
|---|---|---|---|---|
| CR# | Test # | Flame spread | Peak OD | Average OD |
| CR01888 | 1 | 2 ft | 0.07 | 0.03 |
| | 2 | 1 ft | 0.08 | 0.03 |
| CR01889 | 1 | — | 0.06 | 0.03 |
| | 2 | 0.5 ft | 0.06 | 0.03 |

Typically, for UL910, the maximum allowable flame spread is 5 feet. Also, with respect to smoke optical density, the maximum allowable peak OD for UL910 is 0.50 and the maximum allowable average OD 0.15. Based on the results shown in the table, both minicord examples exceeded the requirements of UL910 with respect to flame spread, peak smoke optical density and average smoke optical density.

Figure 4:
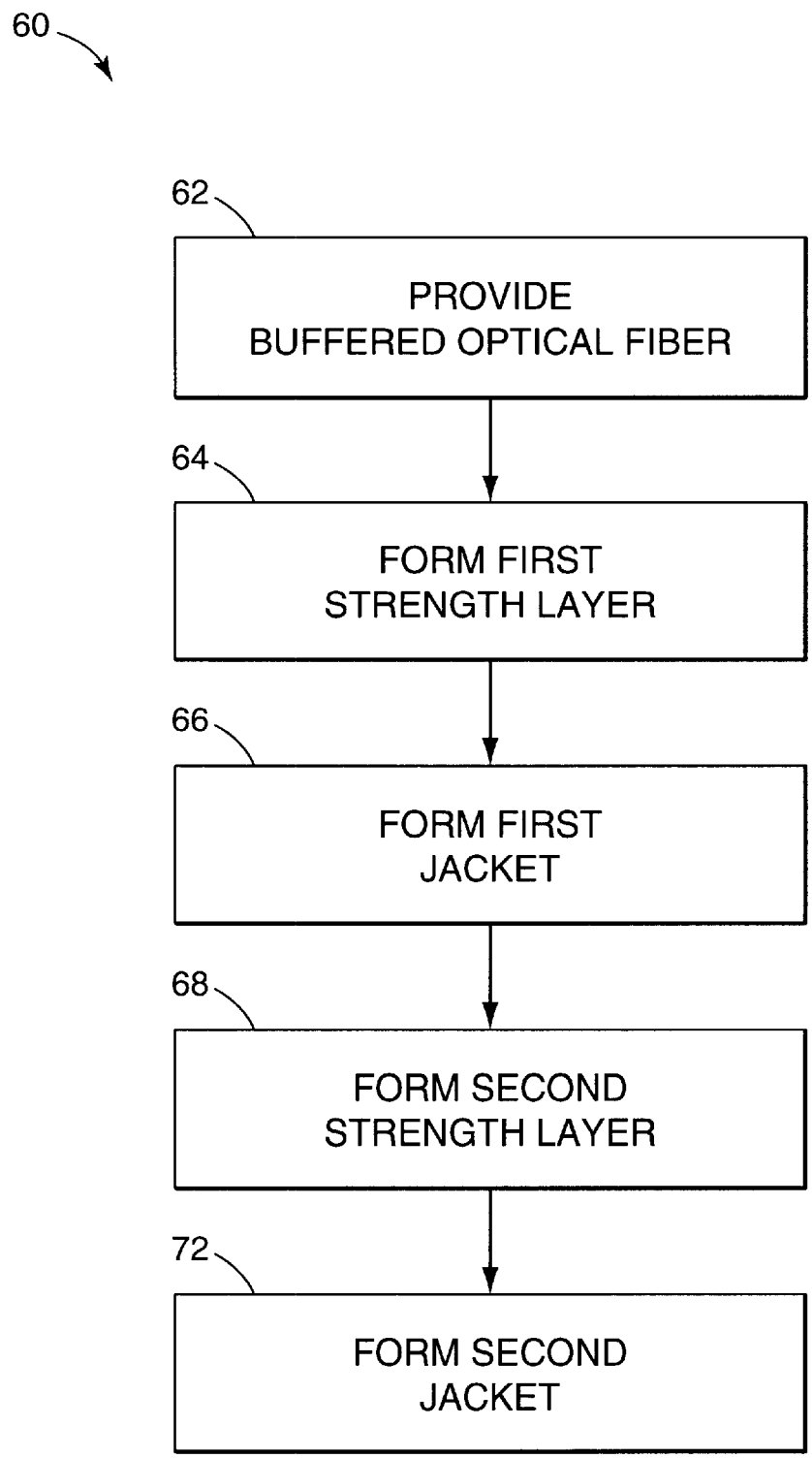
FIG. 4 is a simplified block diagram of a method for making an optical fiber minicord cable according to embodiments of the invention.

Referring now to FIG. 4, a block diagram of a method 60 for making an optical fiber minicord cable according to embodiments of the invention is shown. The method 60 includes a first step 62 of providing one or more buffered optical fibers 32. As discussed hereinabove, the buffered optical fiber 32 includes an optical fiber with a core region, a cladding region, a coating region, and a buffer region.

The next step 64 is to form a first strength layer 34 around the buffered optical fiber 32. For example, according to embodiments of the invention, the step 64 includes forming an polyaramid yarn layer around the buffered optical fiber 32. The first strength layer 34 is formed around the buffered optical fiber 32, e.g., by a multiple aramid yarn payoff, a multiple aramid yarn helical server, or some other appropriate technique.

The next step 66 is to form a first fire resistant jacket 36 around the first strength layer 34. According to embodiments of the invention, the first fire resistant jacket 36 is formed around the first strength layer 34 by an extruder or some other appropriate technique. As discussed previously herein, the first jacket 36 is made of, e.g., a fluoropolymer such as poly(vinylidene fluoride) (PVDF) or poly(vinyl chloride) (PVC). More specifically, exemplary fluoropolymers include, e.g., PVDF Solef® 32008 and low smoke poly (vinyl chloride) (LSPVC) Apex® 910.

The next step 68 is to form a second strength layer 42 around the first fire resistant jacket 36. According to embodiments of the invention, the step 68 includes forming an polyaramid yarn layer around the first fire resistant jacket 36. The second strength layer 42 is formed around the first fire resistant jacket 36, e.g., by a multiple aramid yarn payoff, a multiple aramid yarn helical server, or some other suitable technique.

The next step 72 is to form a second fire resistant jacket 44 around the second strength layer 42. The second fire resistant jacket 44 is formed around the second strength layer 42 by an extruder or some other appropriate technique. The second jacket 44 is made of, e.g., any suitable fluoropolymers such as PVDF Solef® 32008 and low smoke poly(vinyl chloride) (LSPVC) Apex® 910.

It will be apparent to those skilled in the art that many changes and substitutions can be made to the embodiments of the plenum-rated optical fiber minicord cables with high modulus buffered optical fibers described herein without departing from the spirit and scope of the invention as defined by the appended claims and their full scope of equivalents.

What is claimed is:

1. An optical waveguide system for transmitting optical energy, comprising:
   at least one source of optical energy;
   at least one optical fiber minicord cable coupled to the source for transmitting optical energy from the source, the optical fiber minicord cable including a plurality of buffered optical fibers each having a first strength layer and a first fire resistant jacket, a second strength layer formed around the plurality of buffered optical fibers, and a second fire resistant jacket formed around the second strength layer; and
   at least one receiver coupled to the optical fiber minicord cable for receiving optical energy from the source.

2. The system as recited in claim 1, wherein at least one of the fire resistant jackets is made of a material selected from the group consisting of Apex 910 poly(vinylidene fluoride) (PVDF) and Solef 32008 poly(vinylidene fluoride) (PVDF).

3. The system as recited in claim 1, wherein at least one of the first and second strength layers further comprises a polyaramid yarn layer.

4. The system as recited in claim 1, wherein the buffered optical fiber further comprises an optical fiber having a core region, a cladding region formed around the core region, and a buffer region formed around the cladding region.

5. The system as recited in claim 4, wherein the buffer region includes a material selected from the group consisting of nylon, Huls 1670 Nylon, polyolefin, poly(vinylidene fluoride) (PVDF), poly(vinyl chloride) (PVC), or polyester.

6. The system as recited in claim 4, wherein the buffer region further comprises an inner buffer layer formed around the cladding region and an outer buffer layer formed around the inner buffer layer, wherein the modulus of the inner buffer layer is less than that of the outer buffer layer, and wherein the inner buffer layer decreases the adhesion between the cladding region and the outer buffer layer.

7. The system as recited in claim 4, further comprising a coating region formed between the cladding region and the buffer region.

8. A medium for transmitting optical energy within an optical communications system, comprising:
- a plurality of buffered optical fibers each having a first strength layer and a first fire resistant jacket;
- a second strength layer formed around the plurality of buffered optical fibers; and
- a second fire resistant jacket formed around the second strength layer.

9. The medium as recited in claim 8, wherein at least one of the fire resistant jackets is made of a material selected from the group consisting of Apex 910 poly(vinylidene fluoride) (PVDF) and Solef 32008 poly(vinylidene fluoride) (PVDF).

10. The medium as recited in claim 8, wherein at least one of the first and second strength layers further comprises a polyaramid yarn layer.

11. The medium as recited in claim 8, wherein the buffered optical fiber further comprises an optical fiber having a core region, a cladding region formed around the core region, a coating region formed around the cladding region, and a buffer region formed around the coating region.

12. The medium as recited in claim 11, wherein the buffer region includes a material selected from the group consisting of nylon, Huls 1670 Nylon, polyolefin, poly(vinylidene fluoride) (PVDF), poly(vinyl chloride) (PVC), or polyester.

13. The medium as recited in claim 11, wherein the buffer region further comprises an inner buffer layer formed around the cladding region and an outer buffer layer formed around the inner buffer layer, wherein the modulus of the inner buffer layer is less than that of the outer buffer layer, and wherein the inner buffer layer decreases the adhesion between the cladding region and the outer buffer layer.

14. A method of making, an optical fiber minicord cable, said method comprising the steps of:
- providing a plurality of buffered optical fibers;
- forming a first strength layer around each buffered optical fiber;
- forming a first fire resistant jacket around each first strength layer;
- forming a second- strength layer around the plurality of buffered optical fibers; and
- forming a second fire resistant jacket around the second strength layer,
- wherein the second strength layer is formed around the plurality of buffered optical fibers and the second fire resistant jacket is formed around the second strength layer in such a way that the optical fiber transmission medium has a sufficiently high modulus and is plenum-rated.

15. The method as recited in claim 14, wherein at least one of the fire resistant jackets is made of a material selected from the group consisting of Apex 910 poly(vinylidene fluoride) (PVDF) and Solef 32008 poly(vinylidene fluoride) (PVDF).

16. The method as recited in claim 14, wherein at least one of the first and second strength layers further comprises a polyaramid yarn layer.

17. The method as recited in claim 14, wherein the buffered optical fiber further comprises an optical fiber having a core region, a cladding region formed around the core region, a coating region formed around the cladding region, and a buffer region formed around the coating region.

18. The method as recited in claim 17, wherein the buffer region includes a material selected from the group consisting of nylon, Huls 1670 Nylon, polyolefin, poly(vinylidene fluoride) (PVDF), poly(vinyl chloride) (PVC), for polyester.

19. A method of transmitting optical energy in an optical communications system including a source of optical energy, at least one receiver for receiving optical energy and an optical fiber minicord cable operably coupled to the source and the receiver for transmitting optical energy therebetween, said method comprising the steps of:
- providing an optical fiber minicord cable having a plurality of buffered optical fibers each with a first strength layer and a first fire resistant jacket, a second strength layer formed around the plurality of buffered optical fibers, and a second fire resistant jacket formed around the second strength layer; and
- transmitting optical energy from the source to the receiver through the optical fiber minicord cable.

20. The method as recited in claim 19, wherein at least one of the fire resistant jackets is made of a material selected from the group consisting of Apex 910 poly(vinylidene fluoride) (PVDF) and Solef 32008 poly(vinylidene fluoride) (PVDF).

21. The method as recited in claim 19, wherein at least one of the first and second strength layers further comprises a polyaramid yarn layer.

22. The method as recited in claim 19, wherein the buffered optical fiber further comprises an optical fiber having a core region, a cladding region formed around the core region, a coating region formed the cladding region, and a buffer region formed around the coating region.

23. The method as recited in claim 22, wherein the buffer region includes a material selected from the group consisting of nylon, Huls 1670 Nylon, polyolefin, poly(vinylidene fluoride) (PVDF), poly(vinyl chloride) (PVC), or polyester.

* * * * *